Figure 1:
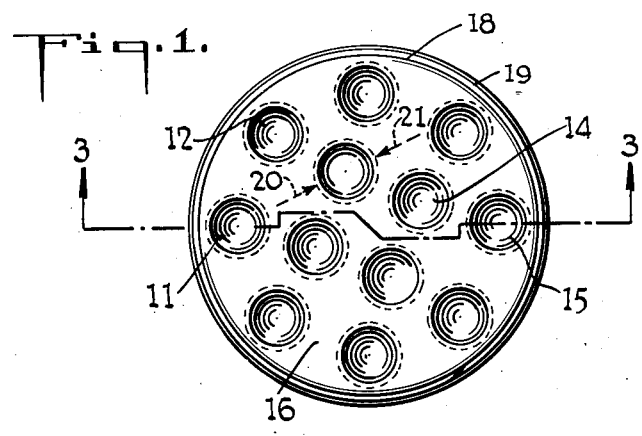

Sept. 30, 1952 M. W. PERCOPO 2,612,261
SUPPOSITORY PACKAGE
Filed Oct. 29, 1949 2 SHEETS—SHEET 1

INVENTOR.
MICHAEL W. PERCOPO
BY Frank Wilen
ATTORNEY

Sept. 30, 1952  M. W. PERCOPO  2,612,261
SUPPOSITORY PACKAGE
Filed Oct. 29, 1949  2 SHEETS—SHEET 2
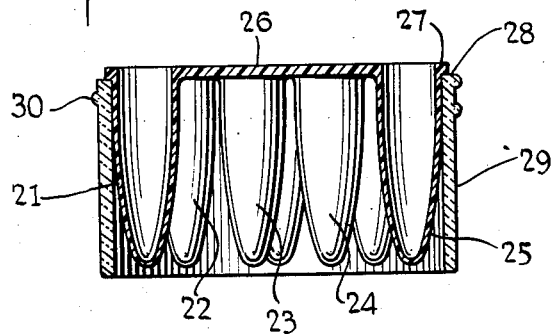
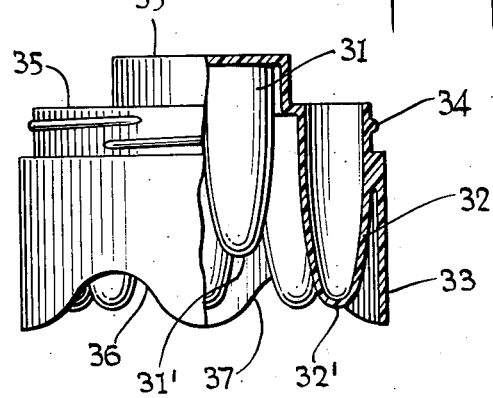
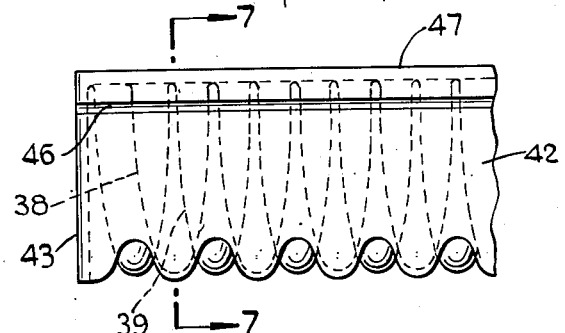
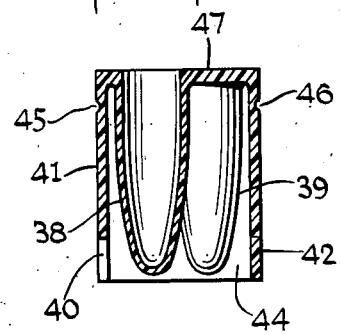
INVENTOR.
MICHAEL W. PERCOPO
BY Frank Wilen
ATTORNEY Patented Sept. 30, 1952

2,612,261

UNITED STATES PATENT OFFICE 2,612,261

SUPPOSITORY PACKAGE

Michael W. Percopo, Brooklyn, N. Y., assignor to E. R. Squibb & Sons, New York, N. Y., a corporation of New York Application October 29, 1949, Serial No. 124,396

4 Claims. (Cl. 206—63.2)

This invention relates to, and has for its object the provision of, improved dispensing-molds for substantially-coniform suppositories or the like (a dispensing mold being a device adapted to serve both as a mold for production of articles and as a container for dispensing the articles produced).

The improved dispensing-molds of this invention essentially comprise a plurality of substantially-coniform, open-base shells of substantially-impervious flexible material joined together at their bases, the shells being so positioned with respect to each other that the apex of each can be gripped between two fingers.

In the usual production of suppositories, the suppository material is shaped in molds, and the suppositories removed therefrom and packaged in receptacles, commonly capped glass jars. The removal of the suppositories from the mold and the packaging in the jars are manual operations, necessarily adding to the cost of the product; and the packages themselves are not adapted for easy dispensing of the suppositories, inasmuch as the suppositories tend to stick together and there is insufficient room for inserting fingers into the jar and gripping a suppository. Consequently, it is frequently necessary to use a pointed instrument for removal of a suppository.

It has been proposed heretofore that suppositories (molded and removed in the usual manner) be packaged in a block of impervious material (such as paraffin) having a plurality of recesses corresponding in shape to the suppositories. Although such packages prevent distortion of the suppositories on melting, as well as protect the suppositories from other injury or contamination, manual operations are still required to remove the suppositories from the molds and insert them in the recesses of the paraffin block; and dispensing of the suppositories still remains difficult, e. g., requiring insertion of a pointed instrument into the base portion of the suppository for lifting it out of the recess. For these reasons, presumably, such package has not been generally adopted.

It has also been proposed heretofore that suppositories be molded in a wooden block containing suppository-shaped chambers, and the block then capped and used as a container for distribution of the suppositories to the consumer (thus combining the separate operations of molding and packing the suppositories into one operation, and eliminating all manual operations). For removal of the suppositories, the bottom of the block is so slotted as to permit it to be broken up into units each containing a single chamber, and then further slotted to permit each of such units to be split open for removal of the suppository. Such dispensing-mold, however, is obviously expensive to produce, and dispensing of the suppository therefrom is difficult (requiring the use of an instrument for splitting off the units and splitting them open); and, for these reasons, such dispensing-mold is impractical (and dispensing-molds for suppositories in general have been considered merely a desideratum).

By this invention there is provided a dispensing-mold for suppositories which is inexpensive to produce, constitutes an efficient container for distribution of the suppositories to the consumer, and which is exceptionally simple to operate for dispensing the suppositories (and hence is highly practical).

Figure 2:
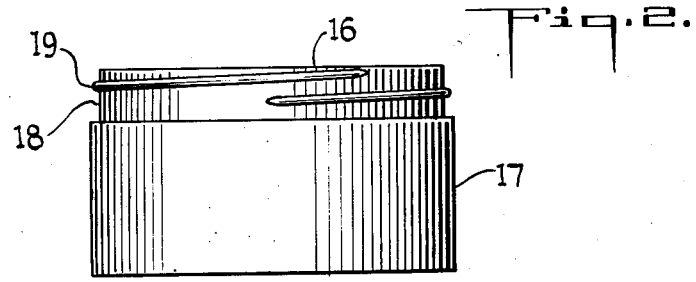
Figure 3:
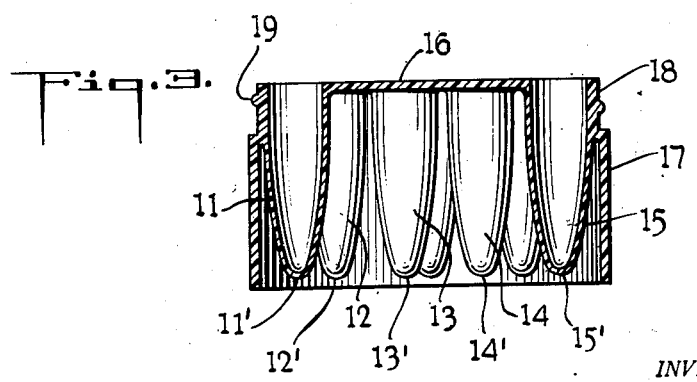

The invention will be described in detail in connection with the accompanying drawing, wherein; Fig. 1 is a plan view of a dispensing-mold for suppositories embodying the invention, the cap being removed; Fig. 2 is an elevation of the dispensing-mold shown in Fig. 1; Fig. 3 is a section view of the dispensing-mold shown in Fig. 1, along the line 3—3 thereon; Fig. 4 is a section view similar to Fig. 3 of another dispensing-mold embodying this invention, the cap being removed; Fig. 5 is a part elevation, part section view of another dispensing-mold embodying this invention, the cap being removed; Fig. 6 is a fragmentary elevation of still another dispensing-mold embodying this invention, the cap being removed; and Fig. 7 is a section view of the dispensing mold shown in Fig. 6, along the lines 7—7 thereof. (The shapes and proportions of the various elements of the dispensing-molds shown are illustrative only, and in some cases— e. g., the thickness of the shell wall—deliberately exaggerated for purposes of clarity of illustration.)

Referring first to Figs. 1, 2, and 3, the numbers 11, 12, 13, 14, and 15 refer to a number of spaced, substantially-coniform, open-base shells (somewhat like pendant fingers) which are of a piece with a transverse member 16 (joining the shells together at their bases, i. e., upper ends), the peripherally-disposed shells and periphery of the transverse member being of a piece also with a substantially rigid depending skirt 17, the entire unit being molded out of a substantially-impervious flexible plastic (e. g., polyethylene). The unit shown is of generally cylindrical shape, the skirt extending below the apices 11', 12', 13', 14', and 15' of the corresponding shells, and serving to support and protect the shells; and the upper portion 18 of the skirt is provided with means (e. g., threading 19) for attachment of a cap (e. g., an ordinary flat screw cap, of metal or plastic, not shown in view of its conventional nature).

As shown in Fig. 1, the shells 11, 12, 13, 14, and 15 (the others not being numbered) are so arranged that the apex (i. e., lower end) of each can be gripped between two fingers, as schematically indicated by arrows 20 and 21 with respect to shell 13. Manifestly, other arrangements than that shown, particularly where there are fewer shells, will provide space for gripping the apex of each shell.

The shape of each shell is substantially-coniform, i. e., it tapers internally from the base to the apex, and at no point is its internal diameter larger than at the base. In other words, its taper and its opening at the top face of transverse member 16 are such that a suppository, after initial dislodgement, is loosely retained in—and may readily be lifted out of—the shell. By virtue of such shape and the flexibility of the shell wall, squeezing of the apex of a shell releases the suppository and forces it upward beyond the top face of the transverse member 16, making the base of the suppository accessible for removal by the fingers. Inasmuch as only the suppository selected for removal is so presented, it may be removed without touching the other suppositories. Alternatively, the suppositories may be released by merely flexing the entire dispensing-mold—i. e., by squeezing the lower end of skirt 17 in the hand, but in such operation one loses the advantage of being able to release one suppository at a time. Also, the suppositories may be released by pressing up on the apex (tip) of a shell.

Such dispensing-mold is used for molding the suppositories in the same manner as ordinary suppository molds. For example, glycerin suppositories are prepared by heating 92 parts (by weight) glycerin on a water bath to about 95° C., adding 8 parts sodium stearate, and stirring the mixture while maintaining the temperature until the sodium stearate is dissolved. Then 5 parts distilled water is added and mixed thoroughly, and the hot liquid then poured into each shell of the dispensing mold. Such filling may be done manually, or (preferably) automatically with a suitable multi-nozzled measuring device. On cooling, the suppository material solidifies, and the dispensing mold is then capped. Preferably the cap is so constructed that it (or a suitable liner therein) contacts the transverse member 16, and thus closes each of the shells. The suppositories are thereby protected on all sides from contamination and from the deteriorative effects of atmospheric conditions (e. g., from the effect of moisture); and even the removal of the cap for dispensing a suppository exposes no more than the tops (i. e., bases) of the remaining suppositories to atmospheric conditions. Moreover, the suppositories are individually supported and thus maintained undistorted even though exposed to temperatures at which the suppository material melts.

The necessary flexibility of the walls of the shells is, of course, a function of the thickness of the walls and the flexibility of the material from which the shells are formed. Desirably, the shell walls should be molded as thin as possible, and the skirt 17 and threaded portion 18 (constituting the substantially-cylindrical exterior of the dispensing mold), as well as the transverse member 16, should be molded thick enough to provide sufficient rigidity for support of the shells and retention of the cap.

The dispensing mold of this invention is preferably molded of a flexible plastic, which must, of course, be nonreactive or compatible with the suppository material and also sufficiently heat-resistant to withstand the temperature of the molten suppository material. Among such materials are polyethylene (i. e., polymerized ethylene; e. g., Polythene), vinyl-chloride-vinyl-acetate copolymer (e. g., Transflex), rubber, and rubber derivatives (e. g., Pliofilm).

The dispensing molds of this invention may be used for other articles of the same general nature and shape as suppositories (e. g., pessaries and bougies)—all of which are herein comprehended by the term "suppositories." The suppositories may be made of various compositions, moldable by heating or otherwise, and may contain various medicaments. Where the shell and/or the particular suppository composition are of such nature that the suppository adheres to the shell wall sufficiently to impair its removability, the difficulty may be overcome by coating the inner surface of the shell with a suitable "lubricating" material before molding the suppository.

The skirt 17 may be replaced by other elements (molded of a piece with the shells and transverse member 16) capable of supporting the apices of the shells. Thus, the support may take the form of substantially-rigid, vertical, diametric or radial, planes extending from transverse member 16 to below the apices of the shells. In the case of dispensing molds with such supports which do not protect the peripherally disposed shells, the dispensing mold may be packed in a suitable carton for protection of the shells during transit.

In the embodiment of the invention shown in Fig. 4, the shells 21, 22, 23, 24, and 25, and transverse member 26 correspond to the shells and transverse member of the embodiment shown in Figs. 1, 2, and 3. However, in this embodiment, the supporting skirt (and threaded portion thereof) is replaced by a peripheral flange 27, which rests on the lip 28 of a rigid cylindrical skirt 29; and the upper portion of this skirt is provided with threading 30 adapted to receive a conventional screw cap (not shown). The cylinder 29 is formed of glass or equivalent, inexpensive, rigid material.

In this embodiment of the invention the advantages of a fully-rigid supporting and cap-retaining member are obtained; and by virtue of its greater simplicity, the skirtless multiple shell member is much more readily molded. In producing such dispensing-mold, the multiple shell member is molded, then inserted into the cylindrical glass skirt to the position shown in Fig. 4 (the dimensions being such as to provide frictional retention of the multiple shell member in the glass cylinder). The suppository molds are then filled as described in connection with the embodiment shown in Figs. 1, 2, and 3, and the resulting dispensing-mold then capped.

The dispensing-mold shown in Fig. 4 is operated in the same manner as that shown in Fig. 1, i. e., by squeezing the apex of a shell to release a suppository. Alternatively, the skirtless multiple shell member is first removed from the cylindrical glass skirt, the apex of a shell squeezed to make the base of a suppository accessible for removal, and the multiple shell member then replaced in the glass skirt (the peripherally-disposed shells being more readily reached with the skirt out of the way).

In the embodiment of the invention shown in Fig. 5, the construction is such as to facilitate the alternative method of removing the suppositories by flexing the entire unit. In this embodiment, shells 31 and 32 (for example), skirt 33 and threading 34 correspond respectively to shells 14 and 15, skirt 17 and threading 19 of the embodiment shown in Fig. 1. However, the center portion 35' of the transverse member 35, which corresponds to transverse member 16 of the embodiment shown in Fig. 1, is raised above the level of the outer portion, the cap (not shown) preferably being correspondingly shaped so as to close off the shells opening on the outer portion of the transverse member as well as the raised center portion. By virtue of this construction, the apices of the shells depending from the raised center portion (e. g., the apex 31' of shell 31) are raised above the level of the apices of the shells depending from the outer portion (e. g., the apex 32' of shell 32), so as to interfere less with these outer shells on flexing the entire unit (by squeezing skirt 33 in the hand). Also, the lower edge of skirt 33 is suitably scalloped to minimize interference of the skirt with squeezing of the aspices of the peripherally-disposed shells, the cut-outs (36 and 37, for example) being positioned adjacent to the apices of some or all of the outer shells. The scalloping of the skirt, incidentally, serves also to conserve material, without materially affecting the support of the unit; and this feature may, of course, be used also in the embodiments of the invention shown in Figs. 1–3 and 4.

In the embodiment of the invention shown in Figs. 6 and 7, the unit is of rectangular (box-like), rather than cylindrical (jar-like) shape; the suppository-containing shells are disposed in parallel straight lines, the shells in each row being offset with respect to the shells in the next row; and the lower edge of the skirt is suitably scalloped to facilitate gripping the apex of each shell. Thus, in the embodiment shown, there are two rows of shells, illustrated by shells 38 and 39 in Fig. 7; and the cut-outs (note cut-out 40 in skirt-side 41, and scalloping of the lower edge of skirt-side 42) are located adjacent to each shell in the near row. Thus, the fingers can pass transversely through a cut-out and the space between the shells in the far row to squeeze the apex of a shell in the near row. Ends 43 and 44 are of a piece with sides 41 and 42, forming therewith a rectangular skirt supporting the shells; and sides 41 and 42 have suitable grooves 45 and 46 therein adjacent to their top edge, for cooperation with a slide cap (not shown) which slides along transverse member 47 to close each of the shells.

The invention may be variously otherwise embodied—for example, as to the materials, shapes, proportions and arrangements of the several parts—within the scope of the appended claims.

I claim:

1. A package of substantially-coniform suppositories or the like, composed of: a dispensing-mold, comprising a plurality of substantially coniform, open-base shells of substantially-impervious flexible material joined together at their bases, and a substantially-rigid member depending from the plane of junction of the shells to a plane below the apices of the shells and holding the apices clear of said lower plane, the shells being so positioned with respect to each other that the apex of each can be gripped between two fingers; correspondingly-shaped suppositories in the shells; and a cap removably attached to the dispensing-mold and covering the open bases of the shells.

2. The package defined by claim 1, in which the substantially-rigid member is a substantially-rigid peripheral skirt, and the lower edge of the skirt has cut-outs adjacent to the peripherally-disposed shells, whereby interference of the skirt with squeezing the apices of the peripherally-disposed shells is minimized.

3. The package defined by claim 1, in which the centrally-disposed shells are positioned above the peripherally-disposed shells.

4. The package defined by claim 1, in which the shells are positioned in parallel rows with the shells of each row offset with respect to the shells of the next row.

MICHAEL W. PERCOPO.

REFERENCES CITED

The following references are of record in the file of this patent:

UNITED STATES PATENTS

| Number | Name | Date |
| --- | --- | --- |
| 1,749,996 | Brush | Mar. 11, 1930 |
| 1,873,081 | Von Witzki | Aug. 23, 1932 |
| 1,921,256 | Hiester | Aug. 8, 1933 |
| 2,182,454 | Sherman | Dec. 5, 1939 |
| 2,415,451 | Synnestvedt | Feb. 11, 1947 |
| 2,433,210 | Gits | Dec. 23, 1947 |
| 2,433,211 | Gits | Dec. 23, 1947 |
| 2,469,067 | Follin | May 3, 1949 |
| 2,530,127 | Kubik | Nov. 14, 1950 |

FOREIGN PATENTS

| Number | Country | Date |
| --- | --- | --- |
| 682,877 | France | Feb. 18, 1930 |